K. K. SCHMIDT & M. KLEINSTÜCK.
PROCESS OF ARTIFICIALLY STAINING WOODS.
APPLICATION FILED NOV. 8, 1912.
1,057,284.
Patented Mar. 25, 1913.
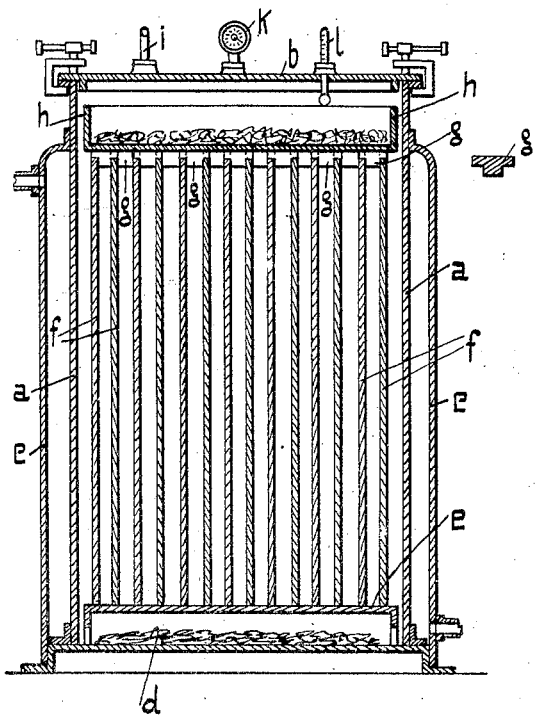

UNITED STATES PATENT OFFICE.

KARL KAMILLO SCHMIDT AND MARTIN KLEINSTÜCK, OF DRESDEN, GERMANY.

PROCESS OF ARTIFICIALLY STAINING WOODS.

1,057,284.  Specification of Letters Patent. Patented Mar. 25, 1913.

Application filed November 8, 1912. Serial No. 730,237.

*To all whom it may concern:*

Be it known that we, KARL KAMILLO SCHMIDT and MARTIN KLEINSTÜCK, citizens of the German Empire, and residing at Dresden, in the Kingdom of Saxony, in said Empire, have invented certain new and useful Improvements in Processes of Artificially Staining Woods, of which the following is a specification.
In Letters Patent granted to Schmidt, Wislicenus and Kleinstück on December 19, 1911, No. 1,012,283, alkaline earth carbonate is employed as a coöperative medium for staining wood, while the process forming the subject-matter of the present invention relates to an improved process of staining wood in which ammonia is made to act in wood in a gaseous condition on the wood, inclosed in a sealed container, under artificially produced heat and pressure.

The characteristic feature of the present process consists in that this treatment is carried out in the presence of unslaked lime or some other hygroscopic medium. By such treatment a rapid and thorough staining of the wood is obtained, together with a favorable change in the juices of the wood, whereas by the before-mentioned process only the well-known ammonia stain, even when it penetrates the entire body of the wood, and then only with woods which contain a considerable quantity of tannin, is produced. The stain obtained by the latter method is, furthermore, not very permanent, nor will it affect to any considerable extent the juices contained in the wood.

The better results obtained by our improved process are due to the following facts: Burned or unslaked lime will by absorbing water or water vapor reduce the qantity of water contained in the container in which the process is carried out, and will thereby contribute toward drying the wood introduced, which could otherwise only be obtained in a closed chamber filled with water vapors by superheating. By such absorption of water large quantities of heat are liberated, which will assist the heating effect of the gases in the boiler. As the treatment is to be carried out at a given pressure and a given temperature, both would however be increased by a continuous generation of water vapors, the addition of lime will also allow of more easily maintaining the desired pressure and temperature in the boiler. As far as such effect depends on the hygroscopic properties of lime, obviously also any other hygroscopical substances may be substituted therefor. Unslaked lime will, however, also have chemical effects in so far as the volatile acids (carbonic acid, formic acid, acetic acid), produced by the "baking" of the wood, will be absorbed by it. By chemically binding the ammonia, these volatile acids would quickly reduce the active quantity of the same, and this is prevented by the presence of a free base in the form of lime. Besides such ammonia which may have temporarily been bound by the volatile acids, will be again liberated and therefore kept active.

The aforementioned circumstances admit of the woods being treated in a green condition, while the other hereinbefore mentioned process required a well seasoned, or even artificially dried wood. The reason for this is that if no lime were used, it would be impossible to get rid of the abundant water vapors, which would render the safe performance of the method more difficult and quickly and considerably reduce the effect of the ammonia.

The process can be carried out by means of the apparatus shown in the accompanying drawing. This apparatus is shown as of a vertical type, whereas for staining wood on a larger scale preferably a horizontal boiler will be used. Into the container *a*, which can be tightly closed by means of the lid *b* and which is provided with a heating jacket *c* is introduced the material to act as stain, which will cover the bottom in form of a layer *d*. As such material chiefly ammonium salts are employed. Carbonate of ammonia may be used, which affords the advantage that it is decomposed into its constituent parts at a low temperature, whereby the active ammonia is liberated. This ammonia may also be produced by a mixture of ammonium sulfate and calcium carbonate. For the same purpose also tobacco waste mixed with unslaked lime may be used, by which pyrrol vapors will be generated. The wood *f* to be stained is placed on a false bottom *e*, which is so arranged that it leaves a free space above the layer *d*. The several pieces of wood may be held in position by distance pieces *g* or the like. On the top is placed an open tray *h* containing the unslaked lime. The thus charged container is then hermetically closed by the lid *b*. An air pump is connected with a short pipe $i$ in the lid, when the process is to be carried out in a vacuum. A pressure gage $k$ and a thermometer $l$ are likewise arranged on the lid. If necessary now first the respective air pressure is produced. It will have a triple effect. Firstly it will assist the penetration of the staining gases or vapors owing to the greater difference in pressure. Then it will, by partly removing the air, avoid the active gases or vapors being diluted by the air. And thirdly it will not be necessary to heat to so high a temperature as when the process is carried out at atmospheric pressure. The more the woods are heated, the more they will be liable to split and crack. After a vacuum has been produced, the container is heated to such a temperature that the effective gases and vapors will be produced. For the aforementioned reason it is advisable to employ a not too high temperature. The gases and vapors enter into the pores of the woods and will produce within a short time the desired stain.

Under certain circumstances the woods may have to be damped. This is done when they are excessively dry, so that they would offer too great a resistance to the entrance of the gases. Such damping of the wood will on the one hand open the pores and on the other hand be more favorable as the chemical reactions will take place, and proceed better and easier in the presence of water.

The removal of a part of the air will in all instances assist the operation; it is however particularly recommended in treating hard, closely grained woods.

We claim:

1. The process herein described of staining woods, which consists in subjecting the not completely dry wood at a raised temperature to the action of a gaseous staining medium in the presence of a hygroscopic substance.

2. The process herein described of staining woods, which consists in subjecting the wood at a raised temperature to the vapors of ammonia in the presence of unslaked lime.

In testimony, that we claim the foregoing as our invention, we have signed our names in presence of two subscribing witnesses.

KARL KAMILLO SCHMIDT,
MARTIN KLEINSTÜCK.

Witnesses:
  OTTO WOLFF,
  PAUL ARRAS.